US007103506B2

(12) United States Patent
Friedrich et al.

(10) Patent No.: US 7,103,506 B2
(45) Date of Patent: Sep. 5, 2006

(54) SYSTEM AND METHOD FOR OBJECT-ORIENTED MARKING AND ASSOCIATING INFORMATION WITH SELECTED TECHNOLOGICAL COMPONENTS

(75) Inventors: Wolfgang Friedrich, Bubenreuth (DE); Wolfgang Wohlgemuth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 10/140,949

(22) Filed: May 9, 2002

(65) Prior Publication Data

US 2002/0191002 A1    Dec. 19, 2002

Related U.S. Application Data

(63) Continuation of application No. PCT/DE00/03942, filed on Nov. 9, 2000.

(30) Foreign Application Priority Data

Nov. 9, 1999    (DE)    ................. 199 53 739

(51) Int. Cl.
    *G06F 11/30*    (2006.01)
(52) U.S. Cl. ............... 702/184; 702/122; 702/127; 702/179; 702/181; 702/182; 702/183; 715/500.1
(58) Field of Classification Search ............... 702/184, 702/122, 127, 179, 181–183; 715/405, 473, 715/500, 500.1, 764, 765
    See application file for complete search history.

(56) References Cited

U.S. PATENT DOCUMENTS 5,729,471 A * 3/1998 Jain et al. .................. 725/131
5,745,387 A   4/1998 Corby, Jr. et al.
5,850,352 A   12/1998 Moezzi et al.
6,625,299 B1 * 9/2003 Meisner et al. ............. 382/103

FOREIGN PATENT DOCUMENTS

| DE | 198 29 640 A1 | 3/1999 |
| DE | 197 51 273 A1 | 5/1999 |
| EP | 0 597 127 A1  | 5/1994 |
| EP | 0 699 997 B1  | 3/1996 |
| WO | WO 98/50834   | 11/1998 |

OTHER PUBLICATIONS

Kuzuoka, H.,"Spatial Workspace Collaboration: A Sharedview Video Support System For Remote Collaboration Capability", Proceedings of the Conference on Human Factors in Computing Systems, May 1992, pp. 533-540.

(Continued)

*Primary Examiner*—Marc S. Hoff
*Assistant Examiner*—Phuong Huynh
(74) *Attorney, Agent, or Firm*—Sughrue Mion, PLLC

(57) ABSTRACT

A system and method for object-oriented marking and assignment of information to selected technological components. For optimized support, particularly during maintenance of automation systems, a system is proposed for object-oriented marking and assignment of information to selected technological components for situation-based support of the interaction between a user and a technical device, particularly for technical and industrial application. The system includes storage means (1) for storing documentation data (I1 . . . In) and recording means (2) for recording real information (R), access means (D) for accessing the documentation data, evaluation means (A) for evaluating the real information and selecting the stored documentation data as a function of the real information, means for virtual marking of a technological component, and means for displaying additional information related to the technological component that is selected by the virtual marking.

17 Claims, 12 Drawing Sheets

OTHER PUBLICATIONS

Ito, S. et al., "Human Oriented Operation Guide For Substations" Proceedings of the International Conference on Systems, Man, and Cybernetics, US, New York, IEEE, Oct. 1994, pp. 1104-1109.

Johnson, D.,"Scada Software Raises The Stakes" Control Engineering International, US, Cahners Publishing, vol. 43, No. 14, Oct. 1996, pp. 80-82.

Daude, R., "Head-Mounted Display Als Facharbeiterorientierte Unterstuetzungskomponente an CNC- Werkzeugmaschinen", Werkstattstechnik, Germany, Springer, vol. 86, No. 5, May 1996, pp. 248-252.

Stoker, C. et al., "Antarctic Undersea Exploration Using a Robotic Submarine with a Telepresence User Interface", IEEE Expert, US, IEEE Inc., New York, vol. 10, No. 6, Dec. 1995, pp. 14-23.

* cited by examiner

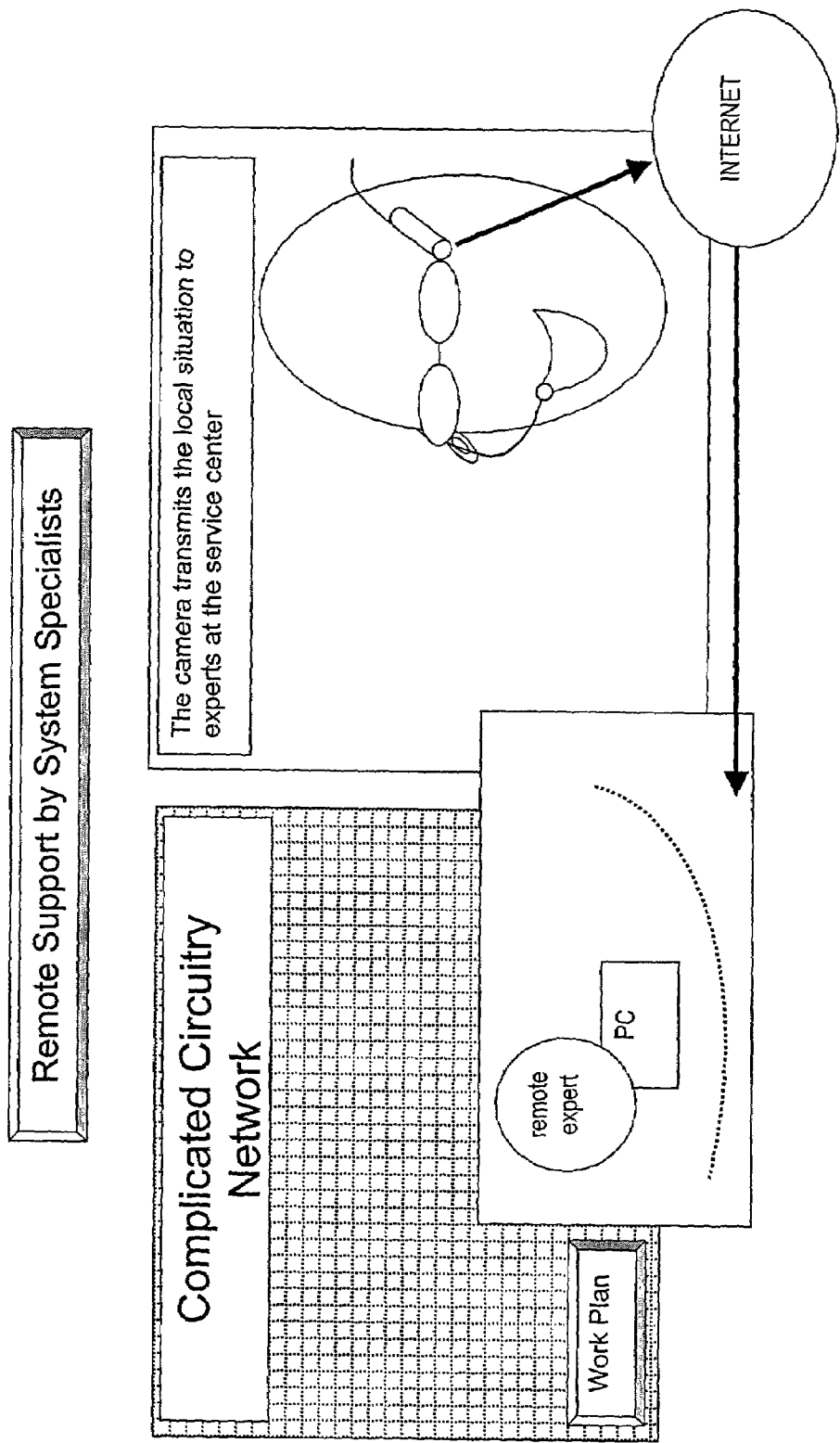

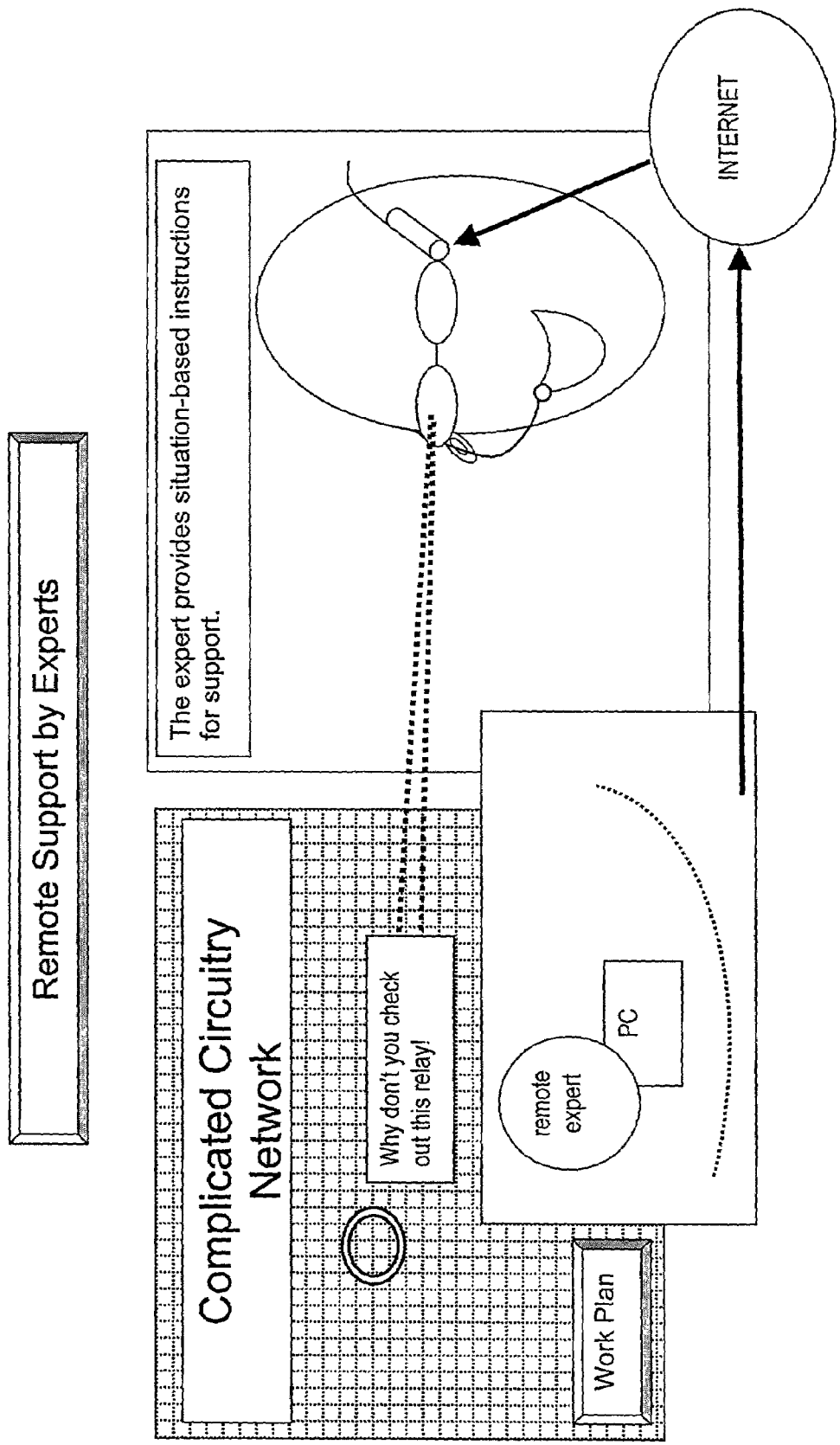
FIG. 12 Remote Support by Experts

SYSTEM AND METHOD FOR OBJECT-ORIENTED MARKING AND ASSOCIATING INFORMATION WITH SELECTED TECHNOLOGICAL COMPONENTS

This is a Continuation of International Application PCT/DE00/03942, with an international filing date of Nov. 9, 2000, which was published under PCT Article 21(2) in German, and the disclosure of which is incorporated into this application by reference.

FIELD OF AND BACKGROUND OF THE INVENTION

The invention relates to a system and method for object-oriented marking and assignment of information to selected technological components.

Such a system and method are used, for instance, in the field of automation technology, production and machine tools, diagnostic/service support systems, and complex components, equipment and systems, such as, for instance, vehicles and industrial machinery and plants.

In the technical article by Daude, R. et al.: "Head-Mounted Display als facharbeiterorientierte Unterstützungskomponente an CNC-Werkzeugrnaschinen" [Head-Mounted Display as a Skilled Worker Support Component on CNC Machine Tools], Werkstattstechnik, DE, Springer Verlag, Berlin, Vol. 86, No. 5, May 1, 1996, pp. 248–252, XP000585192 ISSN:0340-4544, head-mounted display (HMD) denotes a component for supporting the skilled worker in the setup, startup, and fault management of milling machines. The Daude paper discusses the technical interface of the HMD to a modern NC unit and cites the results of a laboratory test utilizing the HMD.

The technical article by Kuzuoka, H.: "Spatial Workspace Collaboration: A Sharedview Video Support System for Remote Collaboration Capability," Proceedings of the Conference on Human Factors in Computing Systems, US, Reading, Addison Wesley, May 3, 1992, pp. 533–540, XP000426833 discloses a system for supporting a skilled worker in a spatially extended workplace. With a head-mounted display (HMD) and a camera fixed to the head of the skilled worker, the worker and a remote expert receive identical image information. The expert provides support to the worker based on this image information.

The technical article by Stoker, C. et al.: "Antarctic Undersea Exploration using a Robotic Submarine with a Telepresence User Interface," IEEE Expert, US, IEEE, Inc. New York, Vol. 10, No. 6, Dec. 1, 1995, pp. 14–23, XP000539881 ISSN:0885-9000, describes a virtual reality system for controlling a very remote underwater robot. The user of this system, via a head-mounted display, sees computer-generated graphics that are based on the picture data taken by a camera installed on the robot. The user can control the alignment of the camera through head movements.

OBJECTS OF THE INVENTION

One object of the invention is to define a system and method permitting rapid and reliable access to relevant documentation data in concrete work situations.

SUMMARY OF THE INVENTION

According to one formulation, the above-mentioned and other objects are attained by a system and method for facilitating efficient maintenance of technological components within a technical system, the maintenance system having storage means for storing documentation data associated with the technological components, marking means for virtual marking at least one of the technological components, recording means for recording real information associated with the marked technological components, access means for accessing documentation data associated with the marked technological components, evaluation means for evaluating the recorded real information and selecting the stored documentation data associated with the marked technological components as a function of the recorded real information and display means for displaying additional information related to the marked technological components.

Documentation data is, for instance, data created when a plant or automation system is erected and/or data created and updated according to predefined criteria during operation of the plant or automation system. This documentation data can be saved on storage media both locally, e.g., at the site of the corresponding application, or at any other place, e.g., at the site of the corresponding manufacturer of the individual plant components. The real information, e.g., taken from an image content, is recorded by recording means and evaluated by evaluation means to permit an assignment of the real objects to the object data stored in the documentation data. Based on the real information data, e.g., in the form of a detected objected, the additional object data contained in the documentation data is then selected, preferably automatically, and is made available, e.g., for on-site service. This permits rapid situation-based access to the data required in a particular situation.

A user-friendly method for the user to mark objects is to control the virtual marking means by speech and/or digital image processing. The user can, for instance, look at a specific object, whereby the camera of an AR (Augmented Reality) system also records the object. The object thus selected is located by image analysis and can be virtually marked. In addition to or even independently of the digital image analysis, the object to be selected and marked can be detected by analyzing user voice commands.

"Global" use of the system independent of the user's location or site can be achieved by an augmented reality system at the location of the user. This augmented reality system can be connected via a data link with a remote expert and/or a remote expert system to transmit the marking and/or return additional information related to the technological component selected by virtual marking. Thus, the marking of the object generated on site can be transmitted to a remote expert who can then send specific additional information on the respectively marked object to the user on site.

Other advantageous embodiments utilize documentation data that is static data and/or dynamic information data. Examples of such static information are technical data from manuals, exploded drawings, maintenance instructions, etc. Examples of dynamic information are process values, such as temperature, pressure, etc.

Rapid situation-based access to the documentation data is further supported by the fact that the recording means an image recording device, the evaluation means are provided to evaluate the real information, such that an application context, particularly an object of the documentation data, is determined from the real information, and the system visualization means to display the documentation data.

Rapid situation-based access to the documentation data is further supported by having the recording means controlled by the user and configured particularly as voice-controlled recording means and/or data-controlled recording means.

For many applications, an optimal use of augmented reality techniques based on static and/or dynamic documentation and/or process data is to configure the recording means and/or the visualization means as data goggles.

BRIEF DESCRIPTION OF THE DRAWINGS

The invention will now be described in greater detail with reference to the exemplary embodiments depicted in the drawing in which FIG. 11 illustrates a seventh situation of object-oriented marking and assignment of information, and FIG. 12 illustrates an eighth situation of object-oriented marking and assignment of information.

DETAILED DESCRIPTION OF THE PREFERRED EMBODIMENTS

Figure 1:
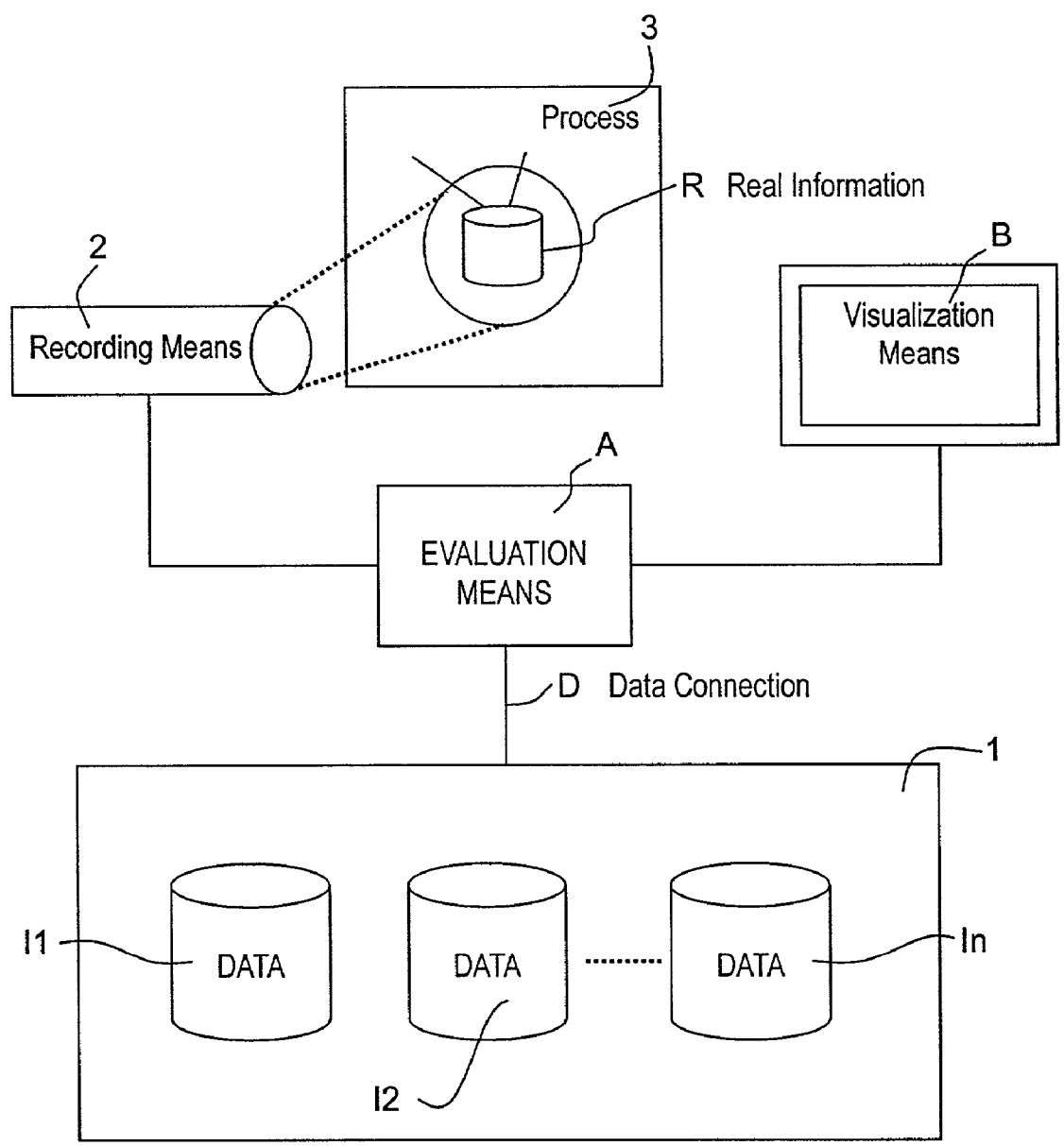
FIG. 1 is a block diagram of an exemplary embodiment of a system for documentation processing.

FIG. 1 is a schematic diagram of a system for documentation processing using augmented reality techniques. The system shown in FIG. 1 comprises evaluation means A to which are connected recording means 2 and visualization means B. According to one embodiment, the evaluation means A is coupled to storage means 1 via a data connection D. The storage means 1 contains information I1 . . . In in the form of documentation data. The recording means 2 are used to record real information R of a process 3, e.g., an automation system.

FIG. 1 shows the basic structure of a system for situation-based documentation processing for technical and industrial applications. The recording means 2, e.g., a video camera, is used to record real information of the technical and industrial application 3, and the evaluation means A, e.g., the digital image processor, are used to analyze and evaluate this information. The real information R is evaluated by evaluation means A by identifying, for instance, individual objects, i.e. individual components of an automation system or an industrial application. Identification of the objects takes place, for instance, through additional information attached to the real objects, e.g., barcode stickers, or by comparing image information with comparison data stored in the evaluation means A and/or documentation data 1. After identifying a desired object that corresponds to the real information R, the documentation data 1 (I1 . . . In) is displayed for a user by visualization means B, either automatically and/or interactively controlled by the user. This documentation data I1 . . . In is additional information for situation-based support during repair, maintenance, etc. The respectively required documentation data is displayed situation-based as a function of the real information. The documentation data I1 . . . In can be stored either on site, e.g., on a data processing device, or at remote sites, in which case it is accessed, for instance, via an Internet connection.

Figure 2:
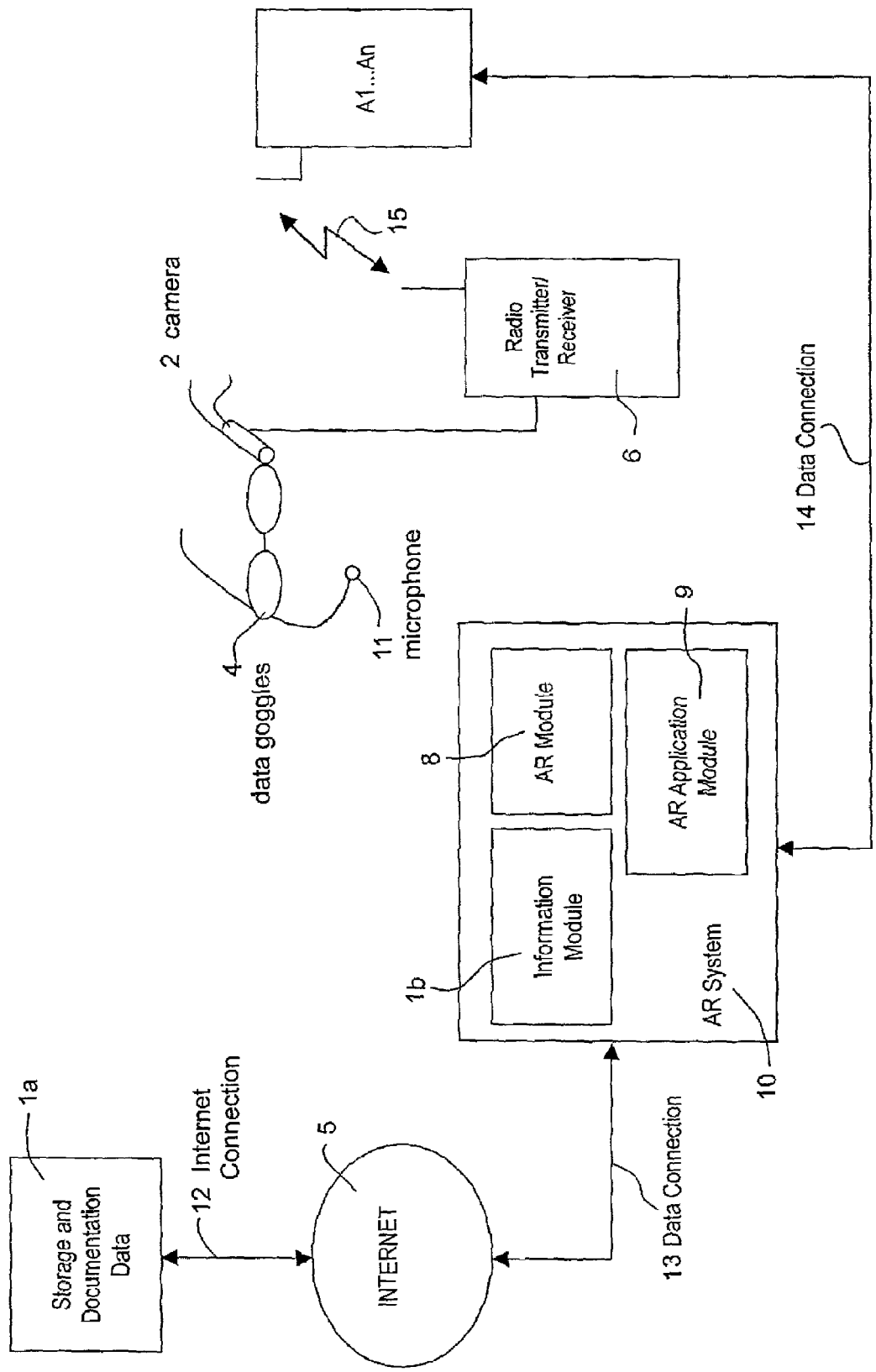
FIG. 2 is a block diagram of an exemplary embodiment of a system for documentation processing.

FIG. 2 is a schematic diagram of a system for documentation processing for situation-based support of the interaction between a user and automation systems A1 . . . An. The user (not depicted in FIG. 2) is equipped with mobile devices 4, 6. These mobile devices 4, 6 include data goggles 4 provided with a video camera 2 and a microphone 11. The data goggles are coupled to a radio transmitter/receiver 6, which communicates with the automation system A1 . . . An via a radio interface 15. The automation system A1 . . . An is coupled to an augmented reality system 10, hereinafter also referred to as an AR system, via a data connection 14. The AR system comprises an information module 1b for storing information data, a basic AR module 8 and an AR application module 9. The AR system 10 can be connected to the Internet 5 via a data connection 13. Additional storage and documentation data 1a can be accessed via Internet connection 12, which is depicted by way of example.

The user, who is equipped with data goggles 4 and mobile radio transmitter/receiver 6, can freely move within automation system A1 . . . An for maintenance and service. For instance, if a specific subcomponent of a plant (i.e., A1 . . . An) requires maintenance or repair, corresponding access to the relevant documentation data 1a and information module 1b are established by means of camera 2 of data goggles 4, possibly controlled by voice commands that are recorded by microphone 11. For this purpose, a radio interface 15 is used to establish a data connection to plant A1 . . . An or a corresponding transmitter/receiver module, and the data is transmitted to the AR system 10. In the AR system the data received from the user is analyzed based on the situation, and information data 1a, and information module 1b is accessed either automatically or by interactive user control. The documentation data 1a, and information module 1b determined to be relevant is transmitted via data connections 14, 15 to radio transmission device 6, and an overall analysis is performed based on the detected work situation. This analysis forms the basis for selecting data from the static information available. This results in a situation-based, object-oriented or component-oriented selection of relevant knowledge from the most up-to-date data sources 1a, and information module 1b. The information is displayed by means of the corresponding visualization component, e.g., a hand-held computer or data goggles. Such devices generally fall under the heading AR-based technologies. Thus, the user on site is supplied only with the information he needs. This information is always up to date. A service technician is therefore not overloaded with information contained, for instance, in a 100-page manual.

Figure 3:
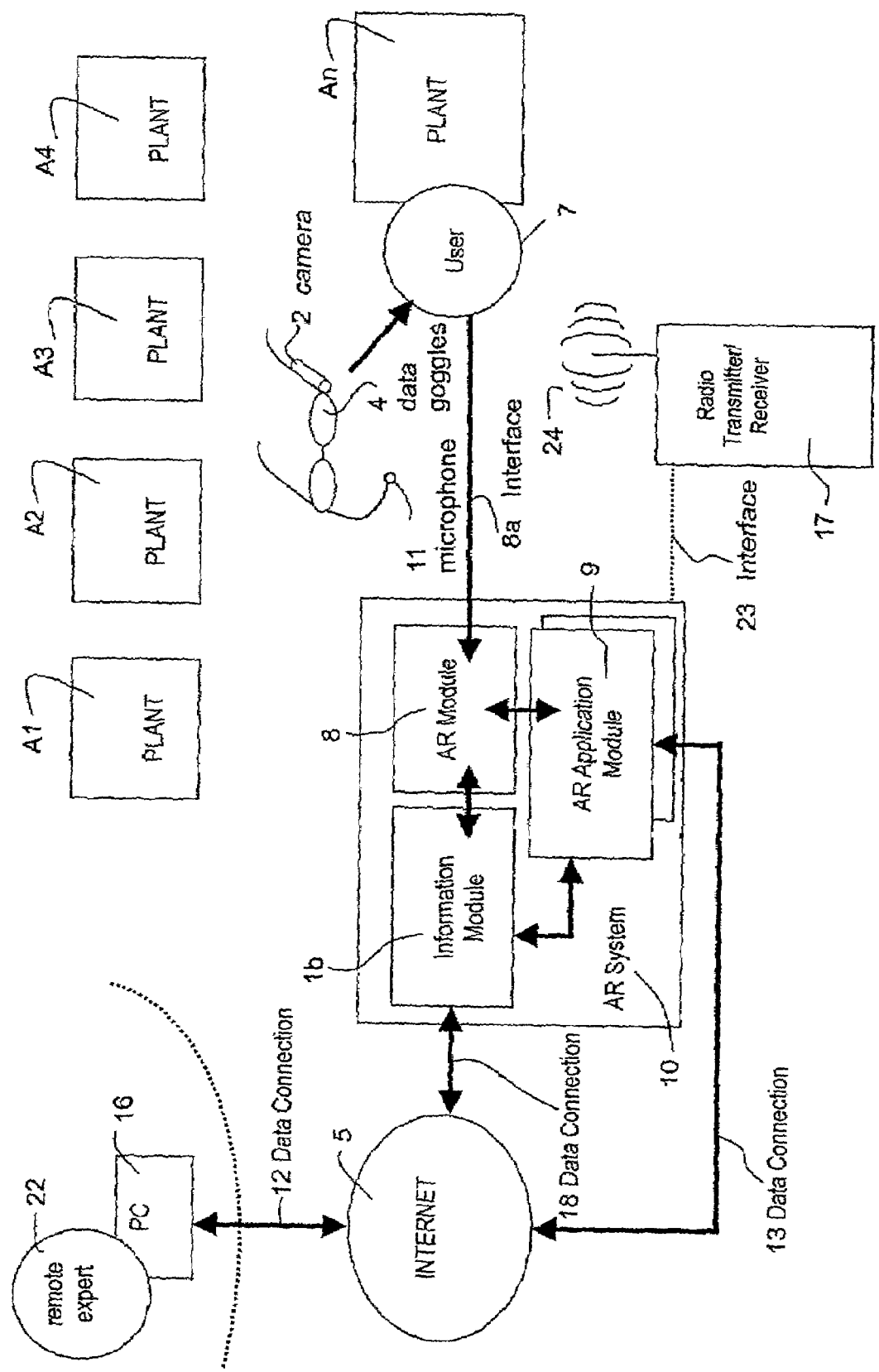
FIG. 3 is a further block diagram of an exemplary embodiment of a system for documentation processing.

FIG. 3 shows a further exemplary embodiment of a documentation processing system for service and maintenance in accordance with the invention. The system of FIG.

3 comprises an augmented reality system 10 with an information module 1b for storing information data, a basic AR module 8, and an AR application module 9. The AR system 10 can be coupled to the Internet 5 via data connection lines 13, 18. A data connection 12 shown by way of example is used to provide a link to a remote PC 16 with a remote expert 22. The individual modules of the AR system 10 are coupled via connections 19, 20, 21. User 7, communicates with the AR system via interfaces 8a, 23. For this purpose, the AR system can be coupled to a transmit/receive device that permits bidirectional data communication between the AR system 10 and user 7 via data goggles 4, either directly via interface 8a or through a radio transmitter/receiver 17 arranged near the user 7 via an interface 23. Connection 23 can be realized via a separate data connection or via the power supply system in the form of a power line modem. Data goggles 4, in addition to the display device arranged near the data goggles, comprises an image recording device 2 in the form of a camera and a microphone 11. User 7 with the aid of data goggles 4, can move within plant A1 . . . An to perform service or maintenance work.

Data goggles 4 and the corresponding radio transmit/receive devices, e.g., radio transmitter/receiver 17, which the personnel carry directly on their body, make it possible to achieve a preventive functionality. First, the corresponding work situation is detected, e.g., by camera 2 or through localization by personnel 7. Based on the detected work situation, the AR system selects data pertaining to plant A1 . . . An. The basic advantage of the system shown in FIG. 3 is that this system provides application-based support for the interaction of the individual functionalities. Thus, a concrete work situation is automatically detected and subsequently analyzed. Aspects relevant to the situation at the time are determined automatically from the most up-to-date static information available, in combination with the dynamic data detected at that moment. This makes it possible, for example, to correlate installation instructions with current process data. A technician 7 thus receives a situation-based display of the relevant information, e.g. by superimposed visualization of the corresponding data, such that the real work situation in the technician's field of view is expanded by the determined information. As a result, personnel 7 can be brought up to task and act as quickly as possible, thereby ensuring that the machine run times do not fall below requirements. The maintenance technician 7 can obtain support on site through remote expert 22 and the knowledge 16 available at the location of remote expert 22.

Figure 4:
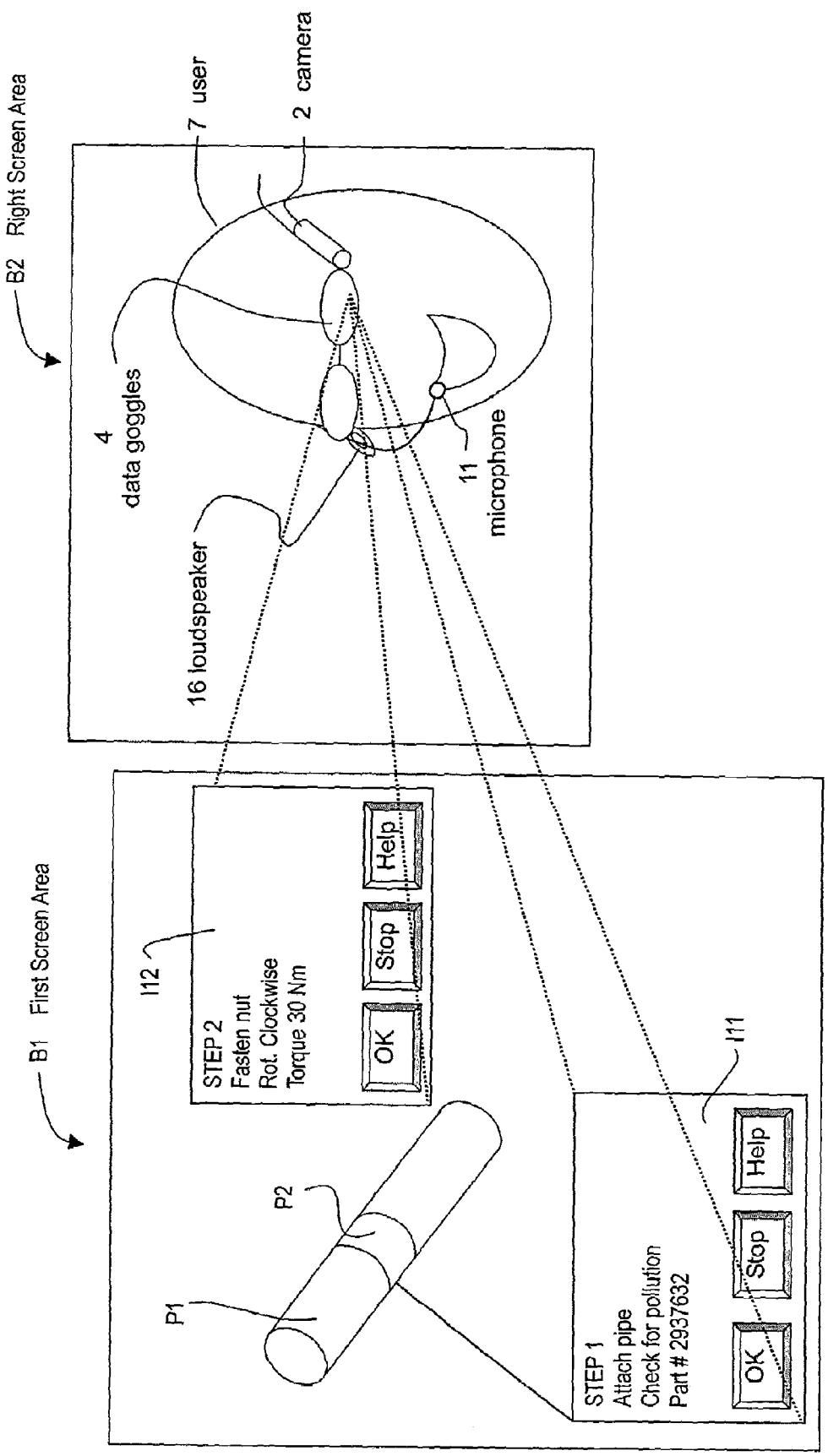
FIG. 4 is an application example of situation-based access to documentation data.
Figure 5:
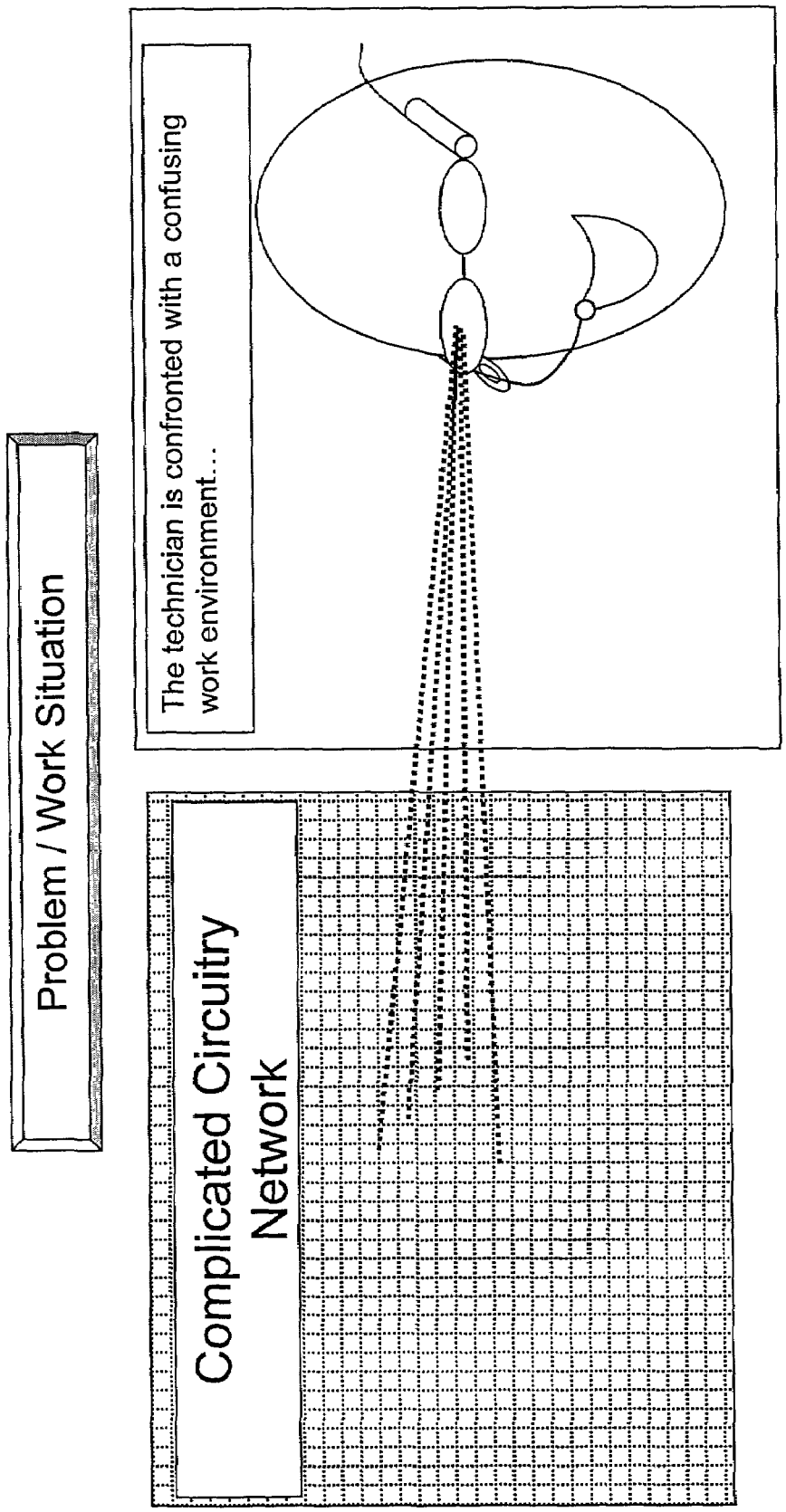
FIG. 5 illustrates a first situation with a posed problem and a work situation of an application example of object-oriented marking and assignment of information to selected technological components.
Figure 6:
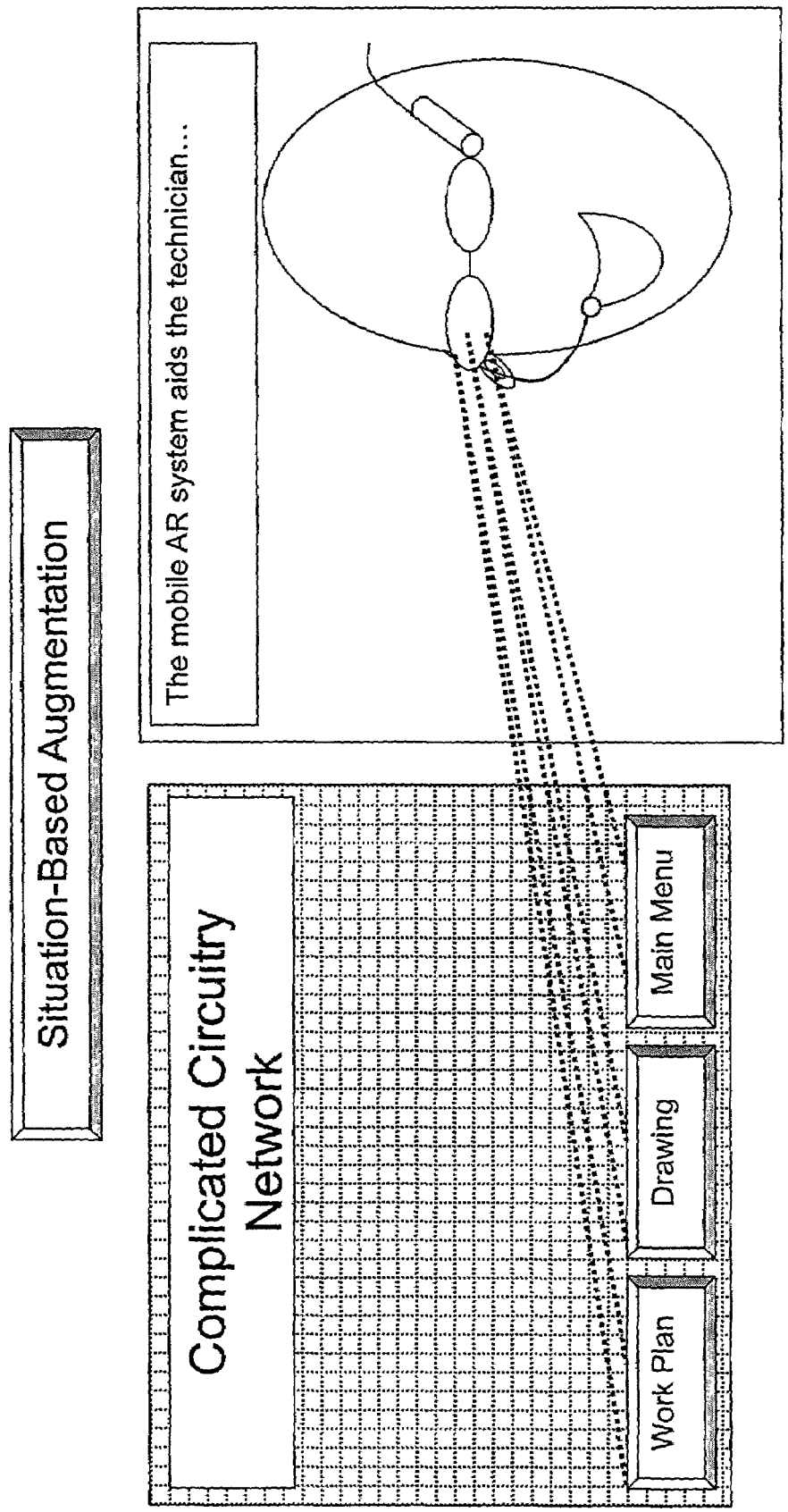
FIG. 6 illustrates a second situation of the application example shown in FIG. 5 with situation-based augmentation.
Figure 7:
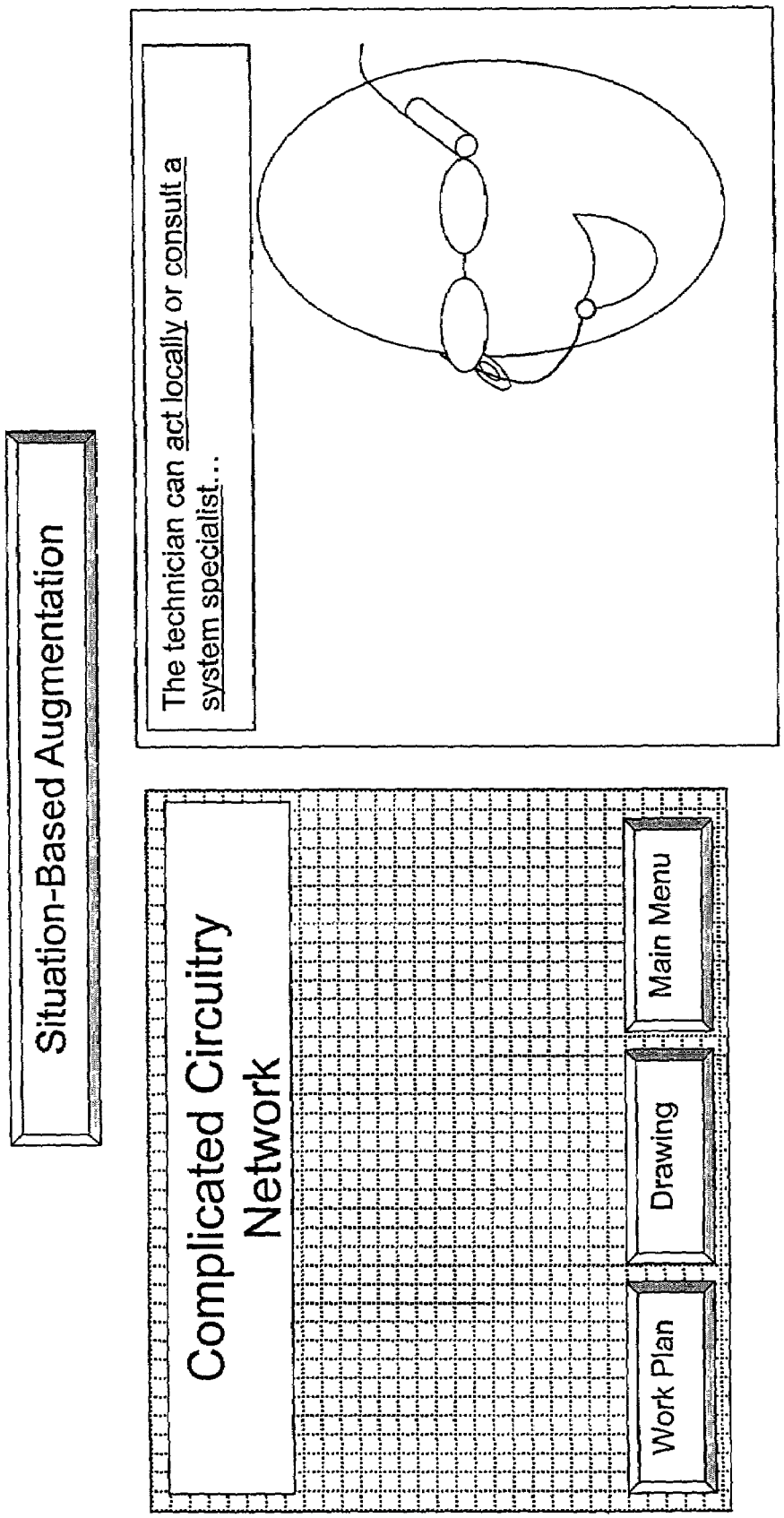
FIG. 7 illustrates a third situation of the application example shown in FIG. 5.
Figure 8:
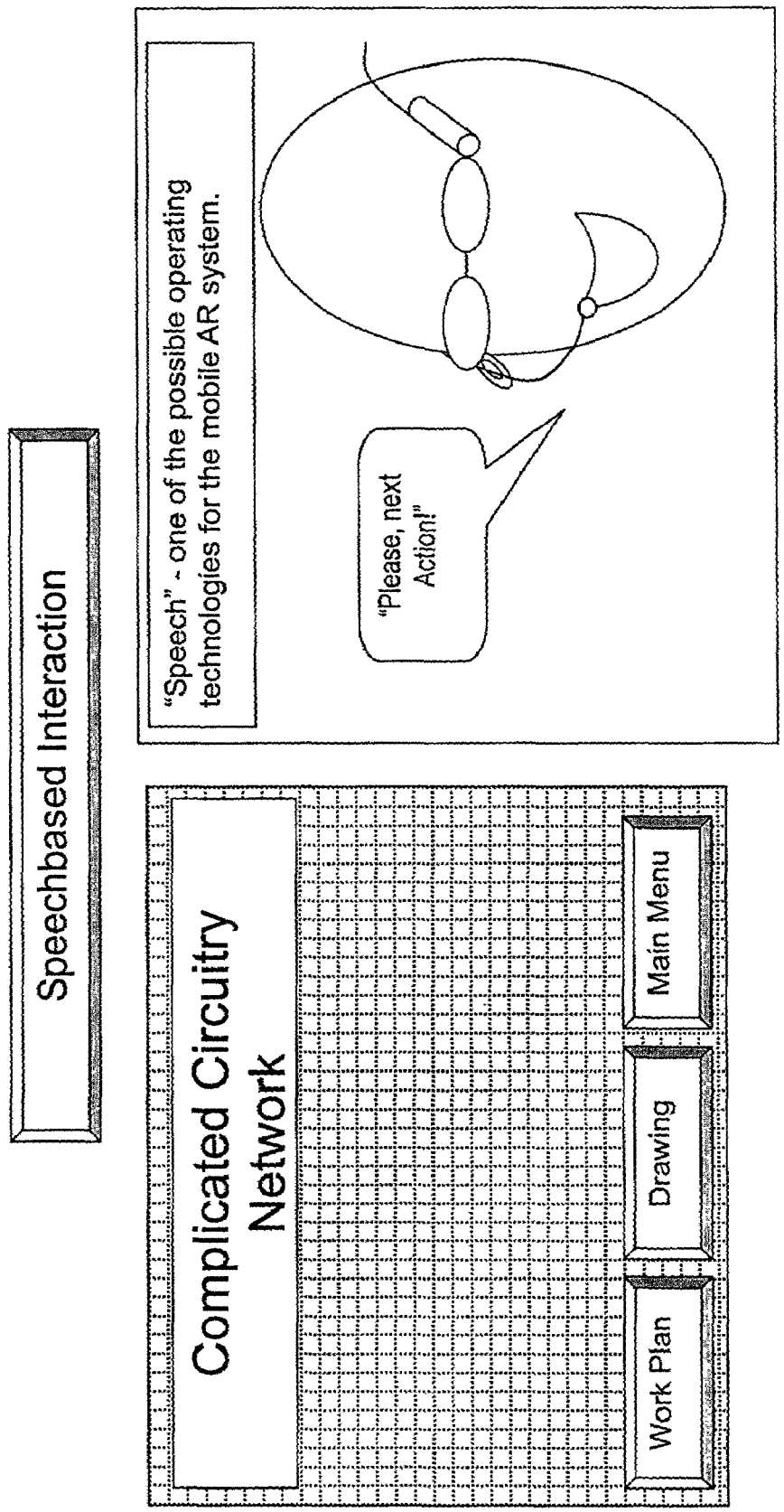
FIG. 8 illustrates a fourth situation of object-oriented marking and assignment of information with speech-based interaction.
Figure 9:
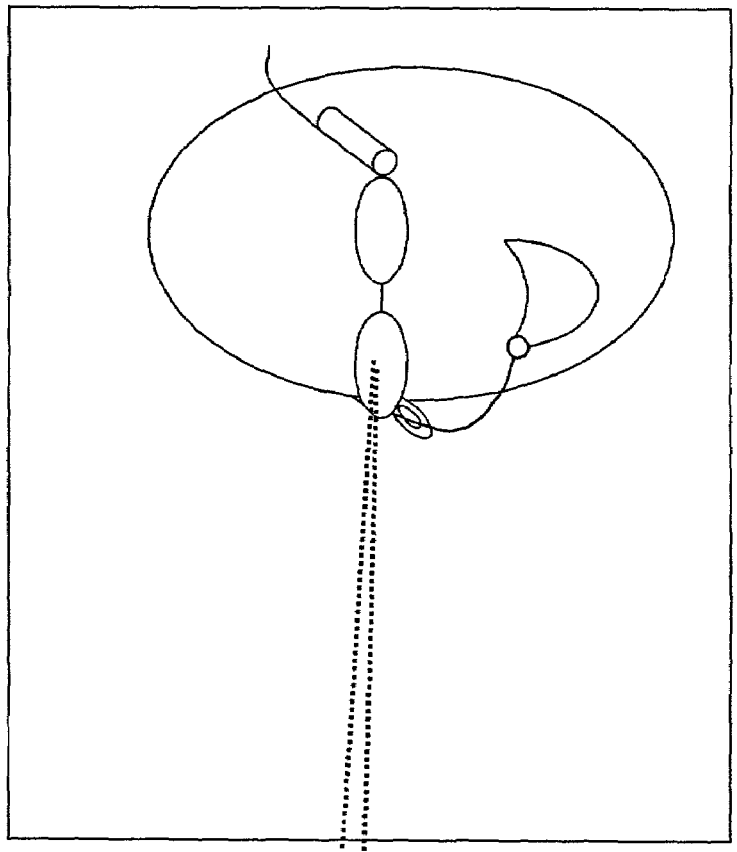
FIG. 9 illustrates a fifth situation of object-oriented marking and assignment of information.
Figure 9:
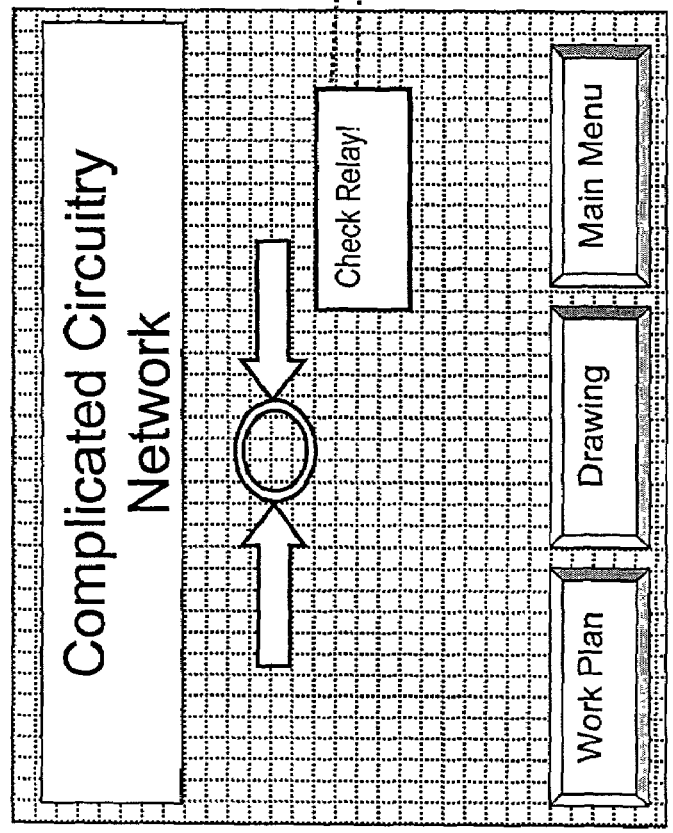
Figure 10:
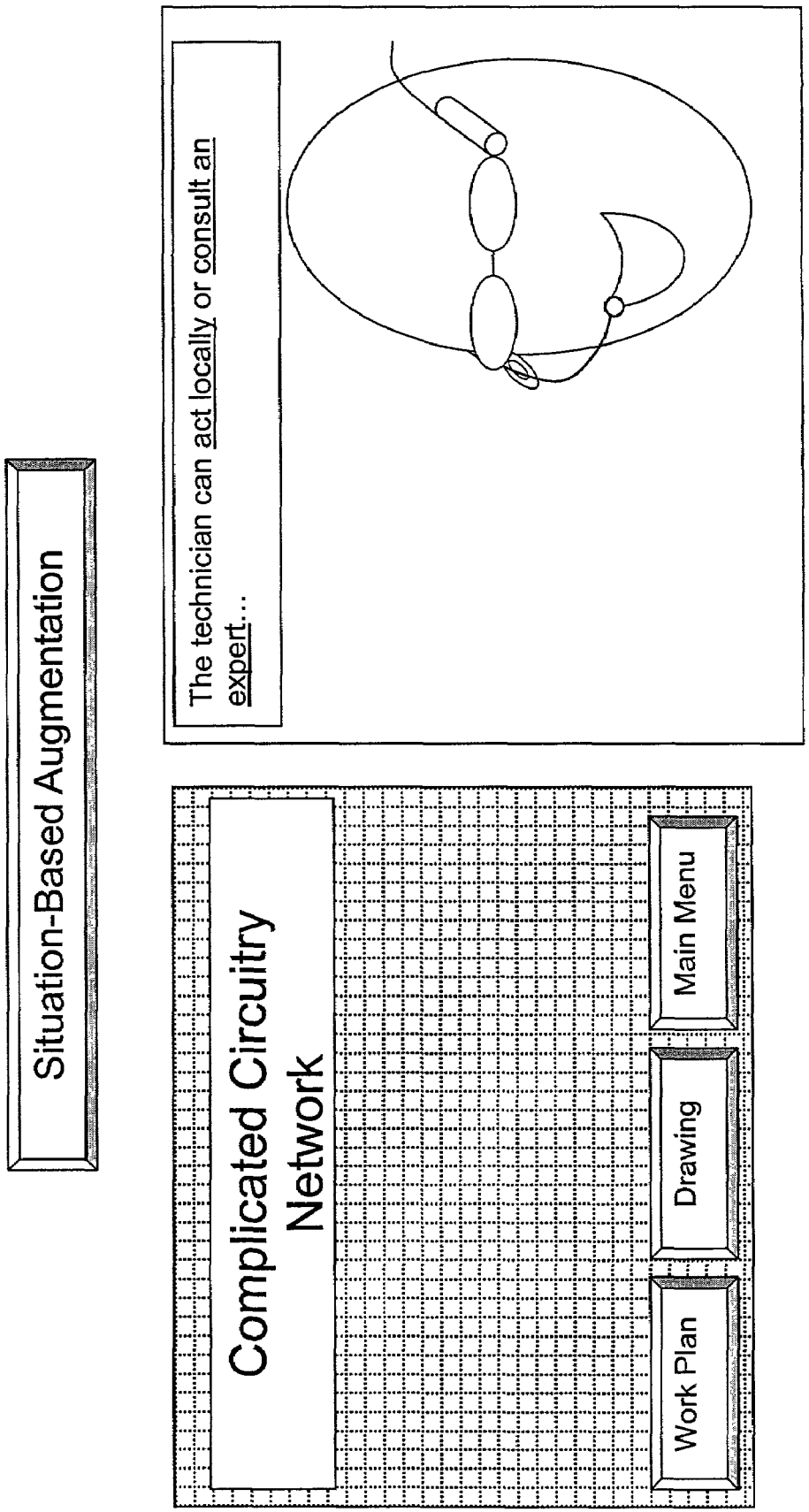
FIG. 10 illustrates a sixth situation of object-oriented marking and assignment of information.

FIG. 4 shows an application example of situation-based access to documentation data. FIG. 4 shows a first screen area B1, which displays a system component. A user 7 looking at, e.g., an individual system component, is shown in the right screen area B2. User 7 is equipped with data goggles 4 including a camera 2 as the recording means. Data goggles 4 are also equipped with a microphone 11 and a loudspeaker 16. A view onto piping, which can be observed by means of the data goggles depicted in screen window B2, is shown in the left screen area B1. In the left screen area B1, two points P1, P2 are marked, each of which represents a detail observed by means of data goggles 4. After observing the first point P1, i.e., after viewing the piping around point P1, additional information is displayed in data goggles 4 for the user 7. This additional information 11 includes documentation data that contains work instructions for this particular pipe segment with respect to point P1 and installation instructions that must be executed in a second step with respect to point P2. The installation instructions in this case give user 7 the torque and the direction of rotation of the screwed connection of point P2 through the display of additional data I12. User 7 thus receives situation-based instructions for the viewed object within the shortest possible time. An intelligent tool capable of detecting a specific torque that is used at the time makes it possible to prompt the user to increase or decrease the current torque.

FIGS. 5 to 12 each depict a situation of an exemplary embodiment regarding object—oriented marking and assignment of information to selected technological components. Assumed is a failure in a system or some other technical equipment (cf. FIG. 5). An existing failure management system pinpoints potential machine components involved in the failure and thus isolates the problem at hand (cf. FIG. 6, 7). The worker/service technician—equipped with a mobile AR system to support his activities-expresses his conjecture, for instance, by pointing with his finger to possible problem zones and/or, for instance, by supporting this conjecture through speech (" . . . this assembly could be defective," cf. FIG. 8). His finger, for instance, leaves a virtual marking on the technological object (e.g., the aforementioned subassembly; cf. circle in FIG. 9), which remains visible for a remote system specialist (an expert at a service center) and for the worker/service technician at the site. The system specialist sees the situation, e.g., on a monitor (FIG. 11), which displays the video image that is transmitted via the camera and a data connection. The worker receives the same display on site on his "mobile monitor" (e.g., a head-mounted display, data goggles, or a hand-held display). The remote system specialist provides comments regarding the problem zone pointed out by the worker using speech and other information (e.g., markings, additional text, or diagrams; cf FIG. 12). This "augmentation" is accomplished by marking through superimposed object-related display (text, image, multi-level information-"view behind the object"). The worker can see the additional information/augmentation particularly with visual reference to the relevant technological object (cf. FIG. 12, "why don't you check out this relay").

One important aspect of the invention is the object-oriented virtual marking and assignment of information to optically detected real technological components, particularly to support a collaboration between workers and remote system specialists. The invention should be understood particularly in the special context of the fields of application "production and machine tools" (NC automated technical processes) as well as "diagnostic/service support systems for complex technical components/equipment/systems" (e.g., vehicles as well as industrial machinery and equipment).

Especially during the phases of production, startup, and service (diagnostics, maintenance, . . . ) conventional technologies are hardly sufficient to provide adequate support for complex processes and machining procedures. With respect to collaborative work, efficient technical means for distributed problem solving, where a remote system specialist communicates with the employee/worker on-site across global distances, are lacking. This case is relevant especially for machine tool manufacturers, most of which are medium-sized companies. Globalization forces them to erect production sites for their customers throughout the world. However, establishing branch offices in all the important markets is not feasible for economic reasons, nor can the profound knowledge of experienced service employees of the parent company be dispensed with in view of the increasingly complex systems.

The invention further relates to the ability to "virtually mark" real technical components that are optically detected.

These "markings" (object identifications) are done by interactive techniques that are very intuitive for the user, e.g., gestures and speech.

Making the objects, etc., eliminates, or at least significantly simplifies, the current approaches, which tend to be manual. Until now, these approaches consisted, for instance, in verbally describing a work situation and providing instructions by telephone to help solve a given problem.

The special feature of the method provided in FIGS. 5 to 12 is the use of man-technology interaction through augmented reality using very simple and intuitive communication with a computer, supplemented, for instance, by multi-modal interaction techniques, such as speech processing or gesture detection.

Technological objects are identified using image recognition methods (analytical image processing) in optically detected and documented real work situations. The worker (i.e., user) uses multi-modal interaction methods, such as gesture detection, possibly combined with speech recognition, to mark or identify relevant technological objects. This marking remains assigned to the technological object and can also be used for support by a remote system specialist.

Another important aspect of the invention is the marking by the worker, the linkage of the marking to the object, and where applicable, the marking and augmentation by remote system specialists.

In summary, the invention thus relates to a system and method for object-oriented marking and assignment of information to selected technological components. For optimized support, particularly during maintenance of automation systems, a system is proposed for object-oriented marking and assignment of information to selected technological components for situation-based support of the interaction between a user and a technical device, particularly for technical and industrial applications. The system includes storage means for storing documentation data and recording means for recording real information, access means for accessing documentation data, evaluation means for evaluating the real information and selecting the stored documentation data as a function of the real information, means for virtual marking of a technological component and means for displaying additional information related to the technological component that is selected by the virtual marking.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A maintenance system for facilitating efficient maintenance of technological components within a technical system, the maintenance system comprising:
    storage means for storing documentation data associated with the technological components;
    marking means for virtual marking at least one of the technological components;
    recording means for recording real information associated with the marked technological components;
    access means for accessing documentation data associated with the marked technological components;
    evaluation means for evaluating the recorded real information and selecting the stored documentation data associated with the marked technological components as a function of the recorded real information; and
    display means for displaying additional information related to the marked technological components.

2. A maintenance system as claimed in claim 1, wherein the marking means are controlled by speech.

3. A maintenance system as claimed in claim 1, wherein the marking means are controlled by digital image processing.

4. A maintenance system as claimed in claim 1, further comprising:
    a connection to a remote expert system operable to transmit an identification of the marked technological components or return additional information related to the marked technological components.

5. A method for object-oriented marking and assignment of information to selected technological components for situation-based support of an interaction between a user and a technical system, the method comprising:
    storing documentation data associated with the technological components;
    virtually marking at least one of the technological components;
    recording real information associated with the marked selected technological components;
    accessing documentation data associated with the marked selected technological components;
    evaluating the recorded real information and selecting the stored documentation data associated with the marked selected technological components as a function of the recorded real information; and
    displaying for the user additional information related to the marked selected technological components.

6. A method as claimed in claim 5, wherein the marking of the selected technological components is applied based on speech.

7. A method as claimed in claim 5, wherein the marking of the selected technological components is applied based on digital image processing.

8. A method as claimed in claim 5, further comprising:
    transmitting an identification of the marked technological component via a data connection to a remote expert or a remote expert system; and
    receiving additional information related to the marked technological component.

9. A maintenance system for facilitating maintenance by a user of a technical system having at least one technological component, the maintenance system comprising:
    a user device with an image collection portion and a speech delivery portion;
    a marking device operable to mark at least one of the technological components, the marked technological components being designated as marked components;
    a storage device operable to electronically store documentation data associated with the technological components; and
    an association device operable to associate the marked components with respective documentation data,
    wherein said user device is operable to retrieve, collect and transmit real data associated with the marked components.

10. A maintenance system as claimed in claim 9, wherein the marked components are identified as potential problematic components of the technical system.

11. A maintenance system as claimed in claim 9, further comprising:
   a remote expert operable to receive the real data from said user device and provide additional data regarding the marked components.

12. A maintenance system as claimed in claim 11, wherein said remote expert receives the real data from said user device via the Internet.

13. A maintenance system as claimed in claim 12 wherein the image collection portion of said user device comprises a display operable to visibly display the documentation data associated with the marked components.

14. A maintenance system as claimed in claim 13 wherein the display of the image collection portion of said user device is further operable to visibly display the additional data.

15. A maintenance system as claimed in claim 9 wherein said marking device comprises means for virtually marking the at least one technological components.

16. A maintenance system as claimed in claim 15 wherein the virtual marking of the at least one technological component is performed by the user pointing at the at least one technological component desired to be marked.

17. A maintenance device usable by a user responsible for maintaining or repairing technological components within a technical system, the maintenance device comprising:
   a marking device operable to identify at least one of the technological components, wherein the marked technological components are identified as potentially problematic components of the technical system;
   an image collection portion operable to collect image data of the marked technological components;
   an audible communication portion operable to receive and transmit audible data from the user to a remote expert and to receive additional audible data from the remote expert and provide the received additional audible data to the user;
   a display portion operable to visibly display the image data and component data associated with the marked technological components, wherein the component data comprises basic data stored for each of the technological components or additional visible data provided by the remote expert.

* * * * *